(12) United States Patent
Tsuchida

(10) Patent No.: US 12,135,830 B2
(45) Date of Patent: Nov. 5, 2024

(54) SECURE COMPUTATION SYSTEM, SECURE COMPUTATION SERVER APPARATUS, SECURE COMPUTATION METHOD, AND SECURE COMPUTATION PROGRAM

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 195 days.

(21) Appl. No.: 17/790,572

(22) PCT Filed: Jan. 20, 2020

(86) PCT No.: PCT/JP2020/001631
§ 371 (c)(1),
(2) Date: Jul. 1, 2022

(87) PCT Pub. No.: WO2021/149092
PCT Pub. Date: Jul. 29, 2021

(65) Prior Publication Data
US 2023/0046000 A1     Feb. 16, 2023

(51) Int. Cl.
*G06F 21/71*     (2013.01)
*G06F 21/55*     (2013.01)

(52) U.S. Cl.
CPC ............ *G06F 21/71* (2013.01); *G06F 21/552* (2013.01); *G06F 2221/034* (2013.01)

(58) Field of Classification Search
CPC .. G06F 21/71; G06F 21/552; G06F 2221/034; G06F 7/58; G06F 7/582
See application file for complete search history.

(56) References Cited

U.S. PATENT DOCUMENTS

| 8,595,275 B2 * | 11/2013 | Nariyoshi | ............... G06F 7/582 |
| | | | 708/250 |
| 9,218,159 B2 * | 12/2015 | Seol | ...................... H04L 9/0869 |

(Continued)

FOREIGN PATENT DOCUMENTS

| JP | 2008-020871 A | 1/2008 |
| JP | 2008-139996 A | 6/2008 |

(Continued)

OTHER PUBLICATIONS

International Search Report for PCT Application No. PCT/JP2020/001631, mailed on Mar. 3, 2020.

(Continued)

*Primary Examiner* — Hosuk Song

(57) ABSTRACT

Each of a secure computation server apparatuses includes a random number generation part that generates random numbers using a pseudo random number generator shared among the secure computation server apparatuses; a seed storage part that shares and stores a seed(s) used for generating random numbers in the random number generation part; a pre-generated random number storage part that stores random numbers generated by the random number generation part; a share value storage part that stores a share(s) to be a target of processing; a logical operation part that computes a carry to be transmitted and received among the secure computation server apparatuses using the random numbers and the share(s) to be a target of processing; an inner product calculation part that removes a mask from the carry; and an arithmetic operation part that performs a processing of erasing the carry to obtain a processing result.

17 Claims, 10 Drawing Sheets

(56) References Cited

U.S. PATENT DOCUMENTS

| | | | |
|---|---|---|---|
| 9,292,259 B2* | 3/2016 | Ross | H04L 9/001 |
| 11,153,104 B2* | 10/2021 | Fetterolf | H04L 9/0869 |
| 11,290,257 B2* | 3/2022 | Tanimoto | H04L 9/0869 |
| 11,477,135 B2* | 10/2022 | Pitio | H04L 47/782 |
| 11,537,362 B2* | 12/2022 | Ross | G06F 7/58 |
| 2016/0218862 A1 | 7/2016 | Ikarashi et al. | |
| 2018/0270057 A1 | 9/2018 | Furukawa | |
| 2019/0052327 A1* | 2/2019 | Motozuka | H04W 88/02 |

FOREIGN PATENT DOCUMENTS

| | | |
|---|---|---|
| JP | 2011-250335 A | 12/2011 |
| WO | 2015/053185 A1 | 4/2015 |
| WO | 2017/038761 A1 | 3/2017 |

OTHER PUBLICATIONS

Toshinori Araki, et al, "High-Throughput Semi-Honest Secure Three-Party Computation with an Honest Majority", Proceedings of the 2016 ACM SIGSAC Conference on Computer and Communications Security. ACM, 2016. p. 805-817, 2016.

Toshinori Araki, et al, "Generalizing the SPDZ Compiler For Other Protocols.", Proceedings of the 2018 ACM SIGSAC Conference on Computer and Communications Security. ACM, 2018. p. 880-895, 2018.

Toshinori Araki, et al, "How to Choose Suitable Secure Multiparty Computation Using Generalized SPDZ", CCS '18, Oct. 15-19, 2018.

Payman Mohassel and Peter Rindal, "ABY3: A Mixed Protocol Framework for Machine Learning", Proceedings of the 2018 ACM SIGSAC Conference on Computer and Communications Security. ACM, 2018. p. 35-52, 2018.

Jun Furukawa, et al, "High-Throughput Secure Three-Party Computation for Malicious Adversaries and an Honest Majority", In J. Coron and J. B. Nielsen, editors, Advances in Cryptology—Eurocrypt 2017—36th Annual International Conference on the Theory and Applications of Cryptographic Techniques, Paris, France, Apr. 30-May 4, 2017, Proceedings, Part II, vol. 10211 of Lecture Notes in Computer Science, pp. 225-255, 2017.

Toshinori Araki, et al, "Optimized Honest-Majority MPC for Malicious Adversaries—Breaking the 1 Billion-Gate Per Second Barrier", In the IEEE S&P, 2017.

Dai Ikarashi et al., MEVAL2 vs. CCS Best paper on MPC-AES_SCIS2017, Preprints of 2017 Symposium on Cryptography and Information Security, Jan. 24, 2017, pp. 1-8.

Jun Furukawa, "Multi-party calculation with high throughput", SCIS2016, Proceedings of Computer Security Symposium 2016, Jan. 19, 2016, pp. 1-7.pdf.

* cited by examiner

SECURE COMPUTATION SYSTEM, SECURE COMPUTATION SERVER APPARATUS, SECURE COMPUTATION METHOD, AND SECURE COMPUTATION PROGRAM

This application is a National Stage Entry of PCT/JP2020/001631 filed on Jan. 20, 2020, the contents of all of which are incorporated herein by reference, in their entirety.

FIELD

The present invention relates to a secure computation system, a secure computation server apparatus, a secure computation method, and a secure computation program.

BACKGROUND

In recent years, research and development referred to as a secure computation have been actively carried out (for example, see Patent Literature (PTL) 1 or Non-Patent Literature (NPL) 1). The secure computation is a technique for performing a predetermined processing while concealing computation processes and a result thereof from a third party. As one of a typical technique for realizing the secure computation, a Multi-Party Computation (MPC) technique is known. According to the Multi-Party Computation technique, secure data are distributedly arranged [i. e. shared] at multiple servers (secure computation servers), and arbitrary operations can be performed while keeping the data secure. Hereinafter, unless otherwise noted, the term "secure computation" means "Multi-Party Computation technique".

NPL2 and NPL 3 disclose a type conversion processing using the secure computation such as a bit-decomposition and a bit-recomposition.

PTL 1: International Publication No. 2015/053185
NPL 1: Toshinori ARAKI, et al, "High-Throughput Semi-Honest Secure Three-Party Computation with an Honest Majority", Proceedings of the 2016 ACM SIGSAC Conference on Computer and Communications Security. ACM, 2016. p. 805-817, 2016
NPL 2: Toshinori ARAKI, et al, "Generalizing the SPDZ Compiler For Other Protocols.", Proceedings of the 2018 ACM SIGSAC Conference on Computer and Communications Security. ACM, 2018. p. 880-895, 2018
NPL 3: Toshinori ARAKI, et al, "How to Choose Suitable Secure Multiparty Computation Using Generalized SPDZ", CCS '18, Oct. 15-19, 2018
NPL 4: Payman Mohassel and Peter Rindal, "ABY3: A Mixed Protocol Framework for Machine Learning", Proceedings of the 2018 ACM SIGSAC Conference on Computer and Communications Security. ACM, 2018. p. 35-52, 2018
NPL 5: Jun FURUKAWA, et al, "High-Throughput Secure Three-Party Computation for Malicious Adversaries and an Honest Majority", In J. Coron and J. B. Nielsen, editors, Advances in Cryptology-EUROCRYPT 2017-36th Annual International Conference on the Theory and Applications of Cryptographic Techniques, Paris, France, April 30-May 4, 2017, Proceedings, Part II, volume 10211 of Lecture Notes in Computer Science, pages 225-255, 2017
NPL 6: Toshinori ARAKI, et al, "Optimized Honest-Majority MPC for Malicious Adversaries-Breaking the 1 Billion-Gate Per Second Barrier", In the IEEE S&P, 2017

SUMMARY

Each disclosure of the above literatures of Citation List is to be incorporated herein by reference thereto. The following analysis is given by the present inventor.

By the way, while arbitrary operations can be performed in the secure computation, there are some processings that are unique to the secure computation due to the special nature of sharing data among multiple secure computation servers. A "bit-injection (or padding)" which is one of type conversions disclosed in the above NPL 3 is also a processing unique to the secure computation. In the secure computation, the bit-injection (or padding) may be performed as a subroutine for realizing a specific application.

For example, in the type conversions, such as the "bit-recomposition", the bit-injections (or paddings) may be performed in parallel. Then, as a degree of parallelism of the bit-injections (or paddings) increases, communication traffic (volume) among secure computation servers also increases. For example, when the bit-injections (or paddings) are performed k times in parallel, communication traffic will be $O(k^2)$, which is a significant increase in communication traffic compared to increasing the degree of parallelism. This will have a significant impact on communication traffic when the degree of the parallelism of the bit-injections (or paddings) is large.

It is an object of the present invention to provide a secure computation system, a secure computation server apparatus, a secure computation method, and a secret calculation program, which contribute to efficient processings, in view of the above circumstances.

According to a first aspect of the present invention, there is provided a secure computation system including at least three or more secure computation server apparatuses connected to each other through a network, wherein
each of the secure computation server apparatuses includes:
a random number generation part that shares a pseudo random number generator, the pseudo random generator being shared among the secure computation server apparatuses;
a seed storage part that shares and stores a seed(s) used for generating random numbers in the random number generation part;
a pre-generated random number storage part that stores random numbers generated by the random number generation part;
a share value storage part that stores at least a share(s) to be a target of processing;
a logical operation part that computes at least a carry to be transmitted and received among the secure computation server apparatuses using the random numbers and the share(s) to be a target of processing;
an inner product calculation part that removes a mask from the carry; and
an arithmetic operation part that performs at least a processing of erasing the carry to obtain a processing result.
[Translators Note: The term with (s) denotes singular and/or plural form. This is because Japanese language of a singular form also represents the plural form, for example, "seed(s)" means "a seed" or "seeds".]

According to a second aspect of the present invention, there is provided a secure computation server apparatus that is one of a secure computation server apparatus among at least three or more secure computation server apparatuses connected to each other through a network, including:
a random number generation part that shares a pseudo random number generator, the pseudo random generator being shared among the secure computation server apparatuses;

a seed storage part that shares and stores a seed(s) used for generating random numbers in the random number generation part;

a pre-generated random number storage part that stores random numbers generated by the random number generation part;

a share value storage part that stores at least a share(s) to be a target of processing;

a logical operation part that computes at least a carry to be transmitted and received among the secure computation server apparatuses using the random numbers and the share to be a target of processing;

an inner product calculation part that removes a mask from the carry; and an arithmetic operation part that performs at least a processing of erasing the carry to obtain a processing result.

According to a third aspect of the present invention, there is provided a secure computation method using at least three or more secure computation server apparatuses connected to each other through a network, including:

generating random numbers using a pseudo random number generator shared among the secure computation server apparatuses;

computing a carry to be transmitted and received among the secure computation server apparatuses using the random numbers and a share(s) to be a target of processing;

removing a mask from the carry by an inner product calculation; and erasing the carry to obtain a processing result.

According to a fourth aspect of the present invention, there is provided a non-transitory computer-readable medium storing therein a secure computation program that causes at least three or more secure computation server apparatuses connected to each other through a network to execute processes, including:

generating random numbers using a pseudo random number generator shared among the secure computation server apparatuses;

computing a carry to be transmitted and received among the secure computation server apparatuses using the random numbers and a share(s) to be a target of processing;

removing a mask from the carry by an inner product calculation; and erasing the carry to obtain a processing result. It is to be noted that this program can be recorded on a computer-readable storage medium. The storage medium can be non-transient one, such as a semiconductor memory, a hard disk, a magnetic recording medium, an optical recording medium, and so on. The present invention can be implemented as a computer program product.

According to each aspect of the present invention, there is provided a secure computation system, a secure computation server apparatus, a secure computation method, and a secret calculation program, which contribute to efficient processings.

PREFERRED MODES

Figure 1:
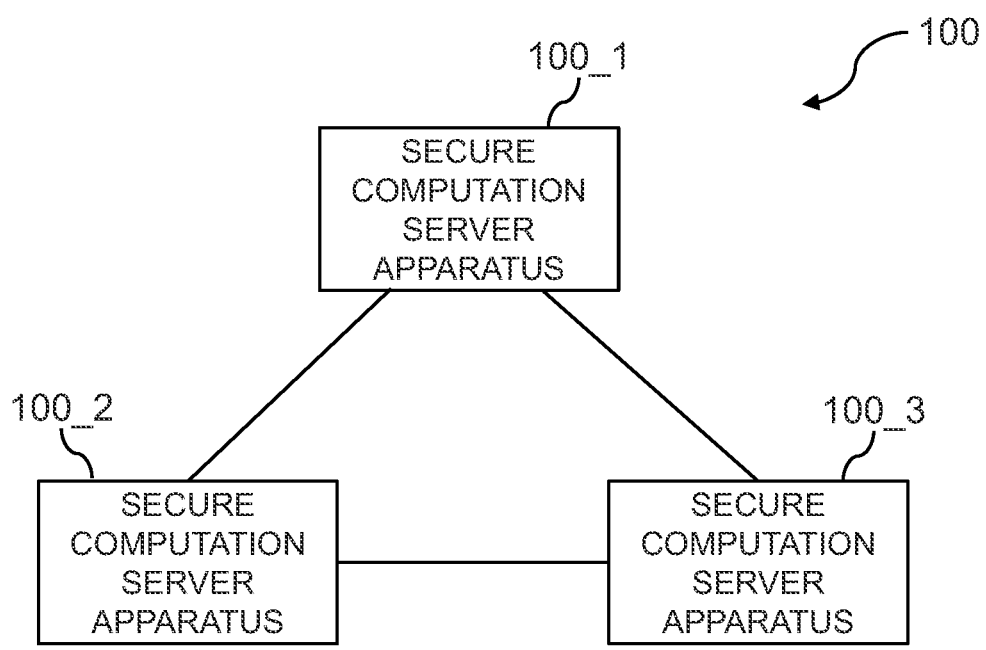
FIG. 1 is a block diagram for illustrating an example of a functional configuration of a secure computation system according to a first example embodiment of the present invention.

Hereinafter, example embodiments of the present invention will be described with reference to the drawings. However, the present invention is not limited to the example embodiments which will be described in the following. Also, it should be noted that the drawings are schematic drawings, and dimensional relationships of respective elements, ratios of respective elements etc. may be different from those in reality. Interactions between drawings may also include parts that have different mutual dimensional relationships and ratios.

[Preparation]

Hereinafter, for explaining the present example embodiment, a notation will be defined and processing elements will be explained. The notation and an operation element(s) explained below will be commonly used in explanations of each example embodiment.

A residue class ring modulo 2 is notated as $Z_2$, and a residue class ring modulo $2^k$ is notated as $Z_2^k$. Here, k is a natural number not smaller than 2. The secure computation server may be referred to $P_i$ for indices i=1, 2, 3. XOR means an exclusive OR.

When a share for an arithmetic operation is denoted by $[x]:=x_1+x_2+x_3 \mod 2^k$ ($x, x_i \in Z_2^k$), each secure computation server $P_i$ has a shared data $[x]_i$ (i=1, 2, 3) as follows.

$P_1: [x]_1=(x_1, x_2)$
$P_2: [x]_2=(x_2, x_3)$
$P_3: [x]_3=(x_3, x_1)$

When a share for a logical operation is denoted by $[[x]]:=x_1 \text{ XOR } x_2 \text{ XOR } x_3 \mod 2$ ($x, x_i \in Z_2$), each secure computation server $P_i$ has a shared data $[[x]]_i$ (i=1, 2, 3), as follows.

$P_1: [[x]]_1=(x_1, x_2)$
$P_2: [[x]]_2=(x_2, x_3)$
$P_3: [[x]]_3=(x_3, x_1)$

[Correlated Randomness]

A correlated randomness $\alpha_i$ (i=1, 2, 3) will be generated as follows. $\alpha_i = H(k_i, \text{vid}) \text{ XOR } H(k_{i+1}, \text{vid})$ Here, a pseudo random number generator H, which is cryptographically safe, is a binary operation [circuit or processing part] defined for a security parameter κ such that H: $\{0, 1\}^\kappa \times \{0, 1\}^\kappa \rightarrow \{0, 1\}$. Seeds $k_i$ (i=1, 2, 3), which are used for generating each of $\alpha_i$ (i=1, 2, 3), are held in each secure computation server $P_i$ as follows; and vid is a publicly opened value, such as a counter.

$P_i$: ($k_i$, $k_{i+1}$), where, $k_{3+1} = k_1$

The $\alpha_i$ generated in this manner can be regarded as random numbers, and the following relationship holds.

$$\alpha_1 \text{ XOR } \alpha_2 \text{ XOR } \alpha_3 = 0$$

Note that a call for a processing of the correlated randomness is expressed by $\alpha_i \leftarrow CR(P_i, (k_i, k_{i+1}), vid)$.

[Random Share]

A random share for the logical operation, $[[r]](r = r_1 \text{ XOR } r_2 \text{ XOR } r_3)$, will be generated as follows.

First, each $r_i = H(k_i, vid)$ is generated using the seeds $k_i$ (i=1, 2, 3) and the vid, which is the publicly opened value, such as the counter, both of which are also used in the explanation of the correlated randomness. Each of the secure computation server $P_i$ will hold each of these generated $r_i$ as a shared data $[[r]]_i$, as follows.

$P_1$: $[[r]]_1 = (r_1, r_2)$
$P_2$: $[[r]]_2 = (r_2, r_3)$
$P_3$: $[[r]]_3 = (r_3, r_1)$

Note that a call for a processing of the random share is expressed by $[[r]] \leftarrow RandGen(P_i, (k_i, k_{i+1}), vid)$.

[Bit-Injection (or Padding)]

A bit-injection (or padding) is a processing that receives the share $[[x]]$ for the logical operation as an input and outputs the share $[x]$ for the arithmetic operation. A call for a processing of the bit-injection (or padding) is expressed by $[x] \leftarrow BitInjection([[x]])$. The method(s) described in NPL 2, NPL 3 and/or NPL 4, for example, can be used as a concrete processing for the bit-injection (or padding). However, other appropriate processing(s) of the bit-injection (or padding) can be used in the example embodiment(s) of the invention.

[Inner Product Calculation]

An inner product calculation is a processing that receives two vectors $([x_1], \ldots, [x_n])$, $([y_1], \ldots, [y_n])$ of the shares for the arithmetic operations related to two vectors $x = (x_1, \ldots, x_n)$, $y = (y_1, \ldots, y_n)$, as inputs, and outputs $[\Sigma_{i=0}^n x_i y_i]$. A call for the processing is expressed by $[\Sigma_{i=0}^n x_i y_i] \leftarrow InnerProduct(([x_1], \ldots, [x_n]), ([y_1], \ldots, [y_n]))$. The method(s) described in NPL 1, and/or NPL 4, for example, can be used as a concrete processing for the inner product calculation. However, other appropriate processing(s) of the inner product calculation can be used in the example embodiment(s) of the invention.

[Subtraction Between Arithmetic Shares]

A subtraction between arithmetic shares is a processing that receives two shares for the arithmetic operation [a], [b] as inputs, and outputs [a-b]. A call for a processing of the subtraction between arithmetic shares is expressed by [a-b] $\leftarrow$ Sub([a], [b]). The method(s) described in NPL 1, and/or NPL 4, for example, can be used as a concrete processing for the subtraction between arithmetic shares. However, other appropriate processing(s) of the subtraction between arithmetic shares can be used in the example embodiment(s) of the invention.

[Resharing]

A resharing is a processing that receives a share for the logical operation $[[x]]$ as an input, and outputs $([x_1], [x_2], [x_3])$, where $x = x_1 \text{ XOR } x_2 \text{ XOR } x_3 \mod 2$. A call for a processing of the resharing is expressed by $([x_1], [x_2], [x_3]) \leftarrow LocalReshare([[x]])$. The method described in NPL 2, for example, can be used as a concrete processing for the resharing. However, other appropriate processing(s) of the resharing can be used in the example embodiment(s) of the invention.

[Generating Random Numbers for Fraud Detection Related to Arithmetic Operation]

Generating random numbers for fraud detection related to the arithmetic operation is a processing that outputs [a], [b], [c], or $\bot$, which means that a fraud has been detected. Here, a, b, c are random value and satisfies a, b, $c \in Z_2^k$ and c=ab. The processing is used for a fraud detection related to an arithmetic multiplication among shares. A call for a processing is expressed by ([a], [b], [c]) $\leftarrow$ A-TripleGen. The method(s) described in NPL 5 and/or NPL 6, for example, can be used as a concrete processing. However, other appropriate processing(s) of the generating random numbers for fraud detection related to the arithmetic operation can be used in the example embodiment(s) of the invention.

[Generating Random Numbers for Fraud Detection Related to Matrix Operation]

Generating random numbers for fraud detection related to a matrix operation is a processing that outputs [A], [B], [C], or $\bot$, which means that a fraud has been detected. Here, A, B, C are random matrices having values on $Z_2^k$, as elements and satisfies C=AB. This processing is used for a fraud detection related to a matrix product operation. Here, a matrix product includes an inner product operation. A call for a processing is expressed by ([A], [B], [C]) $\leftarrow$ M-TripleGen. The method described in NPL 4, for example, can be used as a concrete processing. However, other appropriate processing(s) of the generating random numbers for fraud detection related to the matrix operation can be used in the example embodiment(s) of the invention.

[Fraud Detectable (or Maliciously Secure) Bit-Injection (or Padding)]

A fraud detectable (or maliciously secure) bit-injection (or padding) is a processing that receives $[[x]]$, $([a_j], [b_j], [c_j])$, and $([a'_j], [b'_j], [c'_j])$ as input, and outputs $[x]$ or $\bot$, which means that a fraud has been detected. A call for processing is expressed by $[x] \leftarrow$ m-BitInjection($[[x]]$, $([a_j], [b_j], [c_j])$, $([a'_j], [b'_j], [c'_j])$). The concrete processing can be achieved, for example, by combining the method(s) described in NPL 2, NPL 3 and/or NPL 4 with the method(s) described in NPL 5, and/or NPL 6. However, other appropriate processing(s) of the fraud detectable (or maliciously secure) bit-injection (or padding) can be used in the example embodiment(s) of the invention.

[Fraud Detectable (or Maliciously Secure) Inner Product Calculation]

A fraud detectable (or maliciously secure) inner product calculation is a processing that receives two vectors $([x_1], \ldots, [x_n])$, $([y_1], \ldots, [y_n])$ of the shares for the arithmetic operations related to two vectors $x = (x_1, \ldots, x_n)$, $y = (y_1, \ldots, y_n)$, and ([A], [B], [C]) as input and outputs $[\Sigma_{i=0}^n x_i y_i]$ or $\bot$, which means that a fraud has been detected. A call for processing of the fraud detectable (or maliciously secure) inner product calculation is expressed by m-InnerProduct($([x_1], \ldots, [x_n])$, $([y_1], \ldots, [y_n])$, ([A], [B], [C])). The method described in NPL 4, for example, can be used as a concrete processing. However, other appropriate processing(s) of the fraud detectable (or maliciously secure) inner product calculation can be used in the example embodiment(s) of the invention.

First Example Embodiment

Hereinafter, referring to FIG. 1, FIG. 2 and FIG. 3, description will proceed to a secure computation system and a secure computation method according to a first example embodiment of the present invention.

FIG. 1 is a block diagram for illustrating an example of a functional configuration of the secure computation system according to the first example embodiment of the present invention. A secure computation system 100 according to the first example embodiment of the present invention is provided with a first secure computation server apparatus 100_1, a second secure computation server apparatus 100_2, and a third secure computation server apparatus 100_3, as illustrated in FIG. 1. Each of the first secure computation server apparatus 100_1, the second secure computation server apparatus 100_2, and the third secure computation server apparatus 100_3 is connected to communicate with each other through a network.

Figure 2:
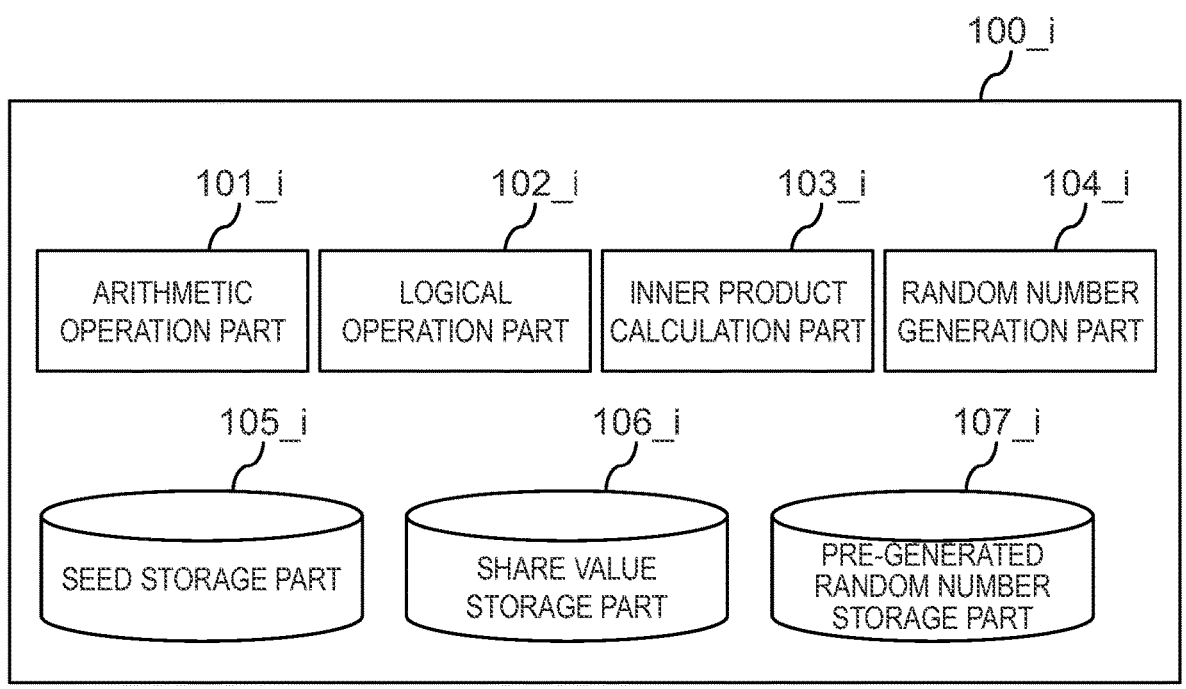
FIG. 2 is a block diagram for illustrating an example of a functional configuration of a secure computation server apparatus.
Figure 3:
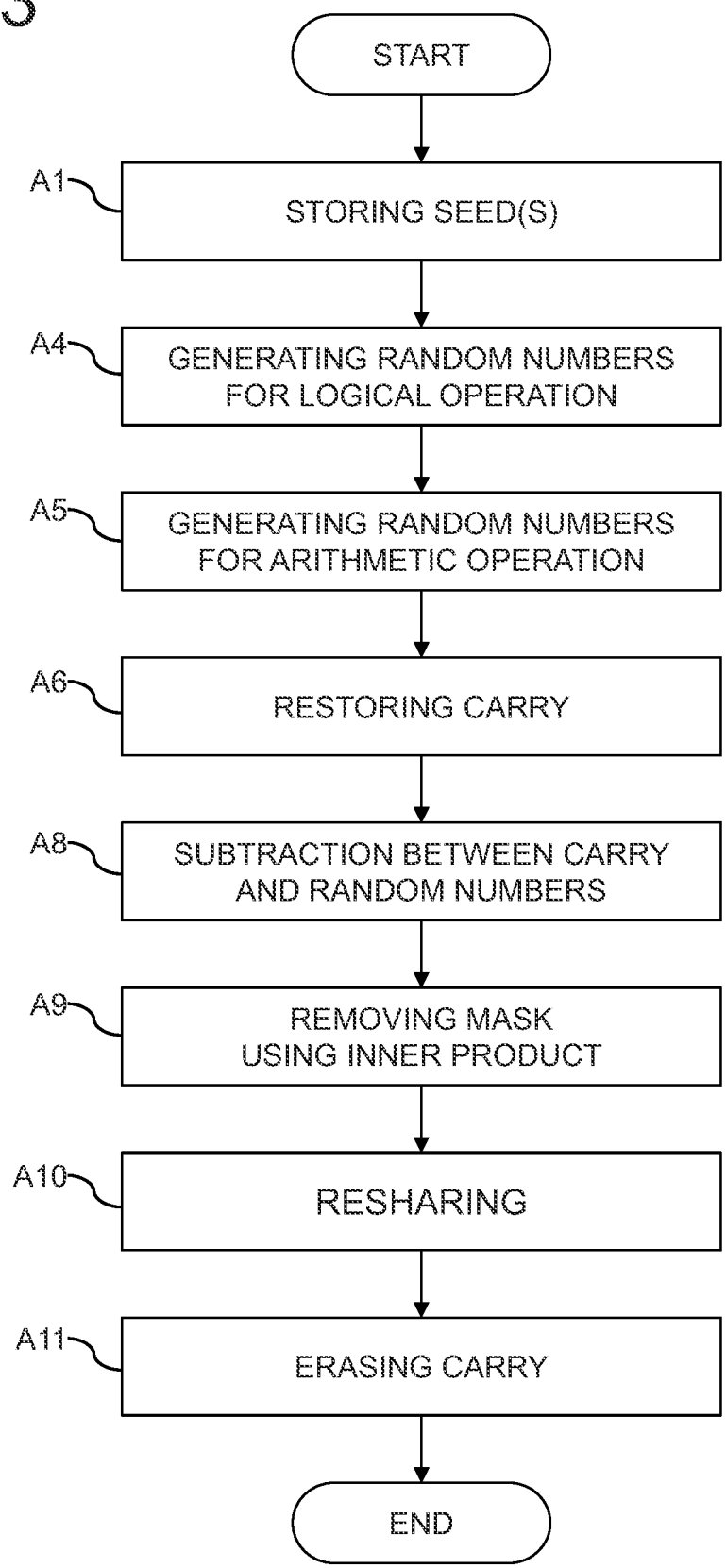
FIG. 3 is a flow chart for illustrating an example of operation regarding a bit-recomposition.

FIG. 2 is a block diagram for illustrating an example of a functional configuration of the secure computation server apparatus. A secure computation server apparatus 100_i (i=1, 2, 3) shown in FIG. 2 is an example of a functional configuration that is representative of the first secure computation server apparatus 100_1, the second secure computation server apparatus 100_2, and the third secure computation server apparatus 100_3.

As illustrated in FIG. 2, the secure computation server apparatus 100_i is provided with an arithmetic operation part 101_i, a logical operation part 102_i, an inner product calculation part 103_i, a random number generation part 104_i, a seed storage part 105_i, a share value storage part 106_i, and a pre-generated random number storage part 107_i. The arithmetic operation part 101_i, the logical operation part 102_i, the inner product calculation part 103_i, the random number generation part 104_i, the seed storage part 105_i, the share value storage part 106_i, and the pre-generated random number storage part 107_i can also be realized by a processor executing a program stored in a memory with a hardware configuration illustrated below.

In the secure computation system 100, provided with the first to the third secure computation server apparatuses 100_i (i=1, 2, 3) of above configuration, for a value(s) of $x_0, \ldots, x_{k-1}$ ($x=\Sigma_{j=0}^{k-1} 2^j x_j$, $x_j \in Z_2$) inputted from one of the first to the third secure computation server apparatuses 100_i among the first to the third secure computation server apparatuses 100_i (i=1, 2, 3), a share [x] is computed, without being known of the value(s) of $x_0, \ldots, x_{k-1}$ ($x=\Sigma_{j=0}^{k-1} 2^j x_j$, $x_j \in Z_2$) from the inputted value and/or a value(s) generated in computation processes, and the share [x] is stored in each of the share value storage parts 106_i of the first to the third secure computation server apparatuses 100_i (i=1, 2, 3), respectively.

In addition, in the secure computation system 100, provided with the first to the third secure computation server apparatuses 100_i (i=1, 2, 3) of above configuration, for the share of $[[x_0]], \ldots, [[x_{k-1}]]$ ($x=\Sigma_{j=0}^{k-1} 2^j x_j$, $x_j \in Z_2$) stored in each of the share value storage parts 106_i of the first to the third secure computation server apparatuses 100_i (i=1, 2, 3), a share [x] is computed, without being known of the value(s) of $x_0, \ldots, x_{k-1}$ ($x=\Sigma_{j=0}^{k-1} 2^j x_j$, $x_j \in Z_2$) from a value(s) generated in the computation processes, and the share [x] is stored in each of the share value storage part 106_i of the first to the third secure computation server apparatuses 100_i (i=1, 2, 3), respectively.

Furthermore, in the secure computation system 100, provided with the first to the third secure computation server apparatuses 100_i (i=1, 2, 3) of above configuration, for a share of $[[x_0]], \ldots, [[x_{k-1}]]$ ($x=\Sigma_{j=0}^{k-1} 2^j x_j$, $x_j \in Z_2$) inputted from an apparatus other than the first to the third secure computation server apparatuses 100_i (i=1, 2, 3), a share [x] is computed, without being known of the value(s) of $x_0, \ldots, x_{k-1}$ ($x=\Sigma_{j=0}^{k-1} 2^j x_j$, $x_j \in Z_2$) from a value(s) generated in computation processes, and the share [x] is stored in each of the share value storage parts 106_i of the first to the third secure computation server apparatuses 100_i (i=1, 2, 3), respectively.

It is noted that the share of the above computation result may be restored by transmitting and receiving the share among the first to the third secure computation server apparatuses 100_1 to 100_3. Alternatively, the share may be restored by transmitting the share to an outside other than the first to the third secure computation server apparatuses 100_1 to 100_3.

Next, a secure computation method according to the first example embodiment of the present invention will be described in detail. That is, an operation of the secure computation system 100 provided with the first to the third secure computation server apparatuses 100_i (i=1, 2, 3), as described above, will be described. FIG. 3 is a flow chart for illustrating an example of operation related to the bit-recomposition. Each step is described below.

(Step A1)

The secure computation system 100 stores seeds ($k_i$, $k_{i+1}$) in each of the seed storage parts 105_i of the first to the third secure computation server apparatuses 100_i (i=1, 2, 3), respectively. It is noted that the first to the third secure computation server apparatuses 100_i (i=1, 2, 3) share a pseudo random number generator H in each of the random number generation parts 104_i.

(Step A4)

Next, the secure computation system 100 generates random numbers for the logical operation. When the secure computation server apparatus 100_i represented as $P_i$, each of the secure computation server apparatuses 100_i performs a processing represented as ($r_{j,i}$, $r_{j,i+1}$)<-RandGen($P_i$, ($k_i$, $k_{i+1}$), vid), (i=1, 2, 3 and j=0, ..., k-1). Assuming that rj=$r_{j,i}$ XOR$r_{j,i}$ XOR $r_{j,i}$ mod 2, each of the secure computation server apparatuses 100_i (i=1, 2, 3) stores $[[r_j]]_i$ in the pre-generated random number storage part 107_i.

(Step A5)

Further, the secure computation system 100 generates random numbers for the arithmetic operation. Each of the arithmetic operation parts 101_i in the first to the third secure computation server apparatuses 100_i (i=1, 2, 3) performs a processing of the bit-injection (or padding) represented as $[r_j]\leftarrow$BitInjection($[[r_j]]$), using $[[r_j]]_i$ which is stored in the pre-generated random number storage part 107_i (j=0, ..., k-1). Then, the first to the third secure computation server apparatuses 100_i (i=1, 2, 3) store the computed share $[r_j]_i$ of the random numbers (or random share) to the pre-generated random number storage parts 107_i.

(Step A6)

Here, the secure computation system 100 uses shares $[[x_0]]_i, \ldots, [[x_{k-1}]]_i$, ($x=\Sigma_{j=0}^{k-1} 2^j x_j$, $x_j \in Z_2$), which are to be targets of the bit-recomposition and are stored in each of the share value storage parts 106_i, for the first time for processing. That is, in the secure computation method according to the first example embodiment of the present invention, it is not necessary to use the targets of the bit-recomposition in the processings from step A1 to step A5. The secure computation method according to the first example embodiment of the present invention, shares $[[x_0]]_i, \ldots, [[x_{k-1}]]_i$ ($x=\Sigma_{j=0}^{k-1} 2^j x_j$, $x_j \in Z_2$), which are to be targets of the bit-recomposition, may have been already stored in each of the share value storage parts 106_i of the first to the third secure computation server apparatuses $100\_i$ ($i=1, 2, 3$), or may be configured to accept an input that is to be targets of the bit-recomposition in step A6.

The secure computation system 100 restores a carry. Concretely, each of the logical operation parts $102\_i$ of the first to the third secure computation server apparatuses $100\_i$ ($i=1, 2, 3$) computes a carry $C_{j,i}$ using, the shares $[[x_0]]_i, \ldots, [[x_{k-1}]]_i (x=\Sigma_{j=0}^{k-1} 2^j x_j, x_j \in Z_2)$, which are to be targets of the bit-recomposition and the shares $[[r_0]]_i, \ldots, [[r_{k-1}]]_i$ of the random numbers for the logical operation, as follows;

$\alpha_i \leftarrow CR(Pi,(k_i, k_{i+1}), vid_{j,\alpha})$ (for $j=0, \ldots, k-1$)

$C_{j,i} = \alpha_{j,i}$ XOR $r_{j,i}$ XOR $(x_{j,i} x_{j,i+1})$ (for $j=0, \ldots, k-1$)

Next, the logical operation part $102\_3$ of the third secure computation server apparatus $100\_3$ transmits $C_{j,3}$ ($j=0, \ldots, k-1$) to the logical operation part $102\_1$ of the first secure computation server apparatus $100\_1$ and the logical operation part $102\_2$ of the second secure computation server apparatus $100\_2$. On the other hand, the logical operation part $102\_1$ of the first secure computation server apparatus $100\_1$ transmits $C_{j,2}$ ($j=0, \ldots, k-1$) to the logical operation part $102\_2$ of the second secure computation server apparatus $100\_2$, and the logical operation part $102\_2$ of the second secure computation server apparatus $100\_2$ transmits $C_{j,1}$ ($j=0, \ldots, k-1$) to the logical operation part $102\_1$ of the first secure computation server apparatus $100\_1$.

Then, the logical operation part $102\_1$ of the first secure computation server apparatus $100\_1$ and the logical operation part $102\_2$ of the second secure computation server apparatus $100\_2$ compute $C_j$ XOR $r_j$ ($j=0, \ldots, k-1$) as follows;

$C_j$ XOR $r_j = C_{j,1}$ XOR $C_{j,2}$ XOR $C_{j,3}$ mod 2

After computation, the logical operation part $102\_1$ of the first secure computation server apparatus $100\_1$ and the logical operation part $102\_2$ of the second secure computation server apparatus $100\_2$ transmit each $C_j$ to the arithmetic operation part $101\_1$ of the first secure computation server apparatus $100\_1$ and the arithmetic operation part $101\_2$ of the second secure computation server apparatus $100\_2$, respectively. Then, each of the arithmetic operation parts $101\_i$ obtains $[C_j$ XOR $r_j]$ as follows;

$P_1$: $[C_j$ XOR $r_j]_1=(0,C_j)$ $P_2$: $[C_j$ XOR $r_j]_2=(C_j,0)$ $P_3$: $[C_j$ XOR $r_j]_3=(0,0)$

Further, each of the arithmetic operation parts $101\_i$ transmits $[C_j$ XOR $r_j]$ ($j=0, \ldots, k-1$) to each share value storage part $106\_i$, respectively, and each share value storage part $106\_i$ stores $[C_j$ XOR $r_j]$($j=0, \ldots, k-1$) therein.

(Step A8)

The secure computation system 100 performs subtraction between the carry and the random numbers. Concretely, the arithmetic operation parts $101\_i$ of the first to the third secure computation server apparatuses $100\_i$ ($i=1, 2, 3$) compute $[(C_j$ XOR $r_j)-r_j]$ ($j=0, \ldots, k-1$) using, $[C_j$ XOR $r_j]$ and $[r_j]$ ($j=0, \ldots, k-1$), as follows;

$[(C_j$ XOR $r_j)-r_j] \leftarrow Sub([C_j$ XOR $r_j],[r_j])$

After computation, each of the arithmetic operation parts $101\_i$ transmits $[(C_j$ XOR $r_j)-r_j]$ ($j=0, \ldots, k-1$) to each share value storage part $106\_i$, then, each share value storage part $106\_i$ stores $[(C_j$ XOR $r_j)-r_j]$($j=0, \ldots, k-1$) therein.

(Step A9)

The secure computation system 100 performs computation to remove a mask from the carry using inner product. Concretely, the inner product calculation parts $103\_i$ of the first to the third secure computation server apparatuses $100\_i$ ($i=1, 2, 3$) perform following computation using $[(C_j$ XOR $r_j)-r_j]$ ($j=0, \ldots, k-1$). Here, $[y]=[\Sigma_{j=0}^{k-1} 2^j(-2)c_j]$.

$$\left[\sum_{j=0}^{k-1} 2^j \cdot (-2) \cdot c_j\right] \leftarrow InnerProduct\big((2^0 \cdot (-2) \cdot [(c_0 XOR\, r_0) - r_0],$$
$$(\ldots, 2^{k-1} \cdot (-2) \cdot [(c_{k-1} XOR\, r_{k-1}) - r_{k-1}]),$$
$$([(c_0 XOR\, r_0) - r_0], \ldots, [(c_{k-1} XOR\, r_{k-1}) - r_{k-1}])\big)$$
[Math. 1]

After computation, each of the inner product calculation parts $103\_i$ transmits $[y]_i$ to each share value storage part $106\_i$, respectively, and each share value storage part $106\_i$ stores $[y]_i$ therein.

(Step A10)

The secure computation system 100 performs resharing. Concretely, each of the arithmetic operation parts $101\_i$ of the first to the third secure computation server apparatuses $100\_i$ ($i=1, 2, 3$) performs following computation using $[[x_0]]_i, \ldots, [[x_{k-1}]]_i (x=\Sigma_{j=0}^{k-1} 2^j x_j, x_j \in Z_2, x_j = x_{j,1}$ XOR $x_{j,2}$ XOR $x_{j,3}$ mod 2);

$([x_{j,1}],[x_{j,2}],[x_{j,3}]) \leftarrow LocalReshare([[x_j]])$ (for $j=0, \ldots, k-1$)

(Step A11)

The secure computation system 100 erases the carry. Concretely, the arithmetic operation parts $101\_i$ of the first to the third secure computation server apparatuses $100\_i$ ($i=1, 2, 3$) perform following computation using reshared arithmetic shares, $([x_{j,1}],[x_{j,2}],[x_{j,3}])$($j=0, \ldots, k-1$), and $[y]_i$.

$$[x] = \sum_{j=0}^{k-1} 2^j \cdot ([x_{j,1}] + [x_{j,2}] + [x_{j,3}]) - [y] =$$
$$\sum_{j=0}^{k-1} 2^j \cdot ([x_{j,1}] + [x_{j,2}] + [x_{j,3}] - 2 \cdot c_j) = \sum_{j=0}^{k-1} 2^j \cdot [x_j]$$
[Math. 2]

After computation, each of the arithmetic operation parts $101\_i$ transmits $[x]_i$ to each share value storage part $106\_i$, respectively, and each share value storage part $106\_i$ stores $[x]_i$ therein. Thus, the first to the third secure computation server apparatuses $100\_i$ ($i=1, 2, 3$) obtain $[x]_i$ after the bit-recomposition from shares $[[x_0]]_i, \ldots, [[x_{k-1}]]_i$ ($x=\Sigma_{j=0}^{k-1} 2^j x_j, x_j \in Z_2$), which are to be targets of the bit-recomposition.

The first example embodiment of the present invention described above has advantageous effects which will be described in the following.

According to the first example embodiment of the present invention, efficiency is improved in a processing, such as the bit-recomposition, where the bit-injections (or paddings) is performed in parallel. As explained above, according to the first example embodiment of the present invention, processings of steps A1 to A5 can be performed independently of the input, therefore, only processings of steps A6 to A11 are computed accompanying the input, and the order of communication traffic in processings of steps A6 to A11 is suppressed to O(k). As mentioned above, when bit-injections (or paddings) are performed k times in parallel, the order of communication traffic will be $O(k^2)$, therefore, according to the first example embodiment of the present invention, as compared in the communication traffic after input, communication traffic is improved with respect to orders of magnitude. In other words, the first embodiment of the invention is remarkably efficient.

It should be noted that the first example embodiment of the present invention is not limited to the bit-recomposition but can also be applied to type conversions with modulus conversion. The "modulus" here refers to the modulus when a residue class ring modulo 2 is notated as $Z_2$, and a residue class ring modulo $2^k$ is notated as $Z_2^k$, as described above. Therefore, the first example embodiment of the present invention can be applied to a PopCount (a processing to count the number of bits with a value of 1).

Concretely, the first example embodiment of the present invention can be applied to PopCount by modifying the processing in step A9 and the processing in step A11 above as follows, respectively.

(Step A9) [Math 3]

$$\left[\sum_{j=0}^{k-1}(-2) \cdot c_j\right] \leftarrow$$

$InnerProduct(((-2) \cdot [(c_0 XOR\ r_0) - r_0], \ldots, (-2) \cdot [(c_{k-1} XOR\ r_{k-1}) - r_{k-1}]),$ $([(c_0 XOR\ r_0) - r_0], \ldots, [(c_{k-1} XOR\ r_{k-1}) - r_{k-1}]))$ (Step A11)

$[x] = \Sigma_{j=0}^{k-1}([x_{j,1}] + [x_{j,2}] + [x_{j,3}]) - [y] = \Sigma_{j=0}^{k-1}([x_{j,1}] + [x_{j,2}] + [x_{j,3}] - 2 \cdot c_j) = \Sigma_{j=0}^{k-1}[x_j]$ [Math 4]

Even if the processing in step A9 and the processing in step A11 of the first example embodiment of the present invention are modified as described above, the communication traffic in steps A6 to A11 can be suppressed by O(k).

Second Example Embodiment

Hereinafter, referring to FIG. 4, FIG. 5, and FIG. 6, description will proceed to a secure computation system and a secure computation method according to a second example embodiment of the present invention.

Figure 4:
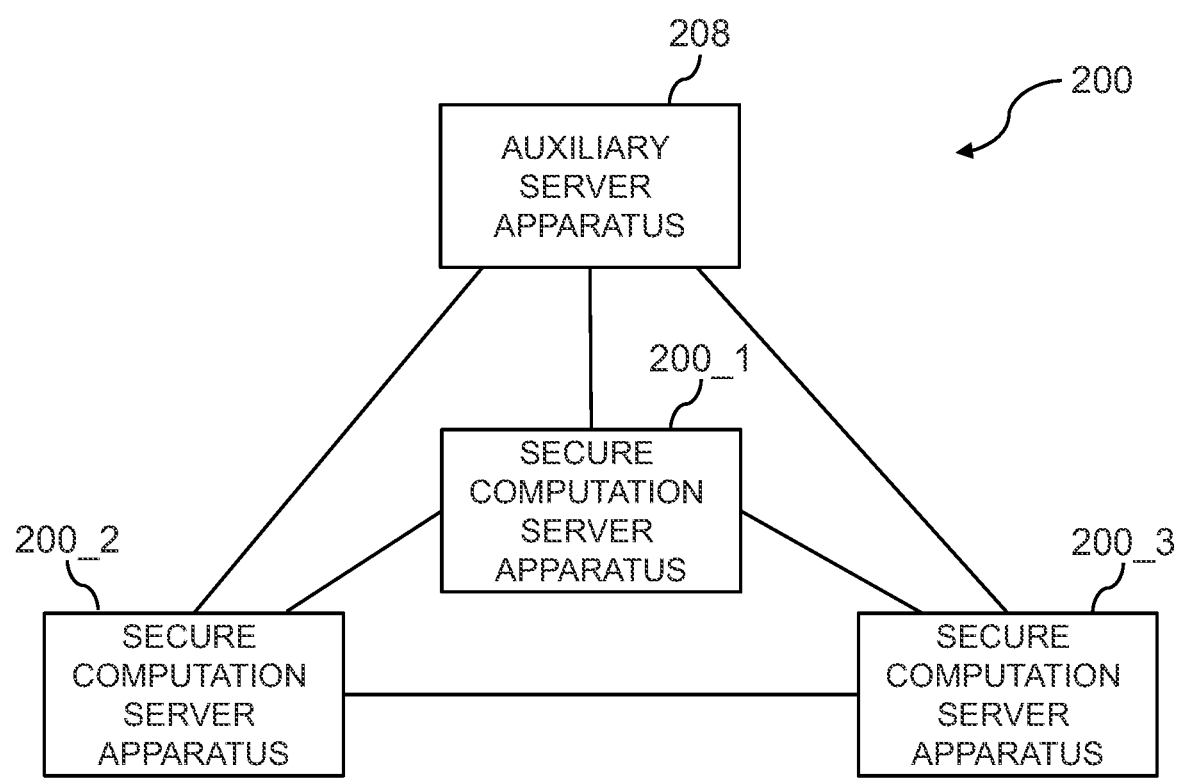
FIG. 4 is a block diagram for illustrating an example of a functional configuration of a secure computation system according to a second example embodiment of the present invention.

FIG. 4 is a block diagram for illustrating an example of a functional configuration of the s secure computation system according to the second example embodiment of the present invention. A secure computation system 200 according to the second example embodiment of the present invention is provided with a first secure computation server apparatus 200_1, a second secure computation server apparatus 200_2, a third secure computation server apparatus 200_3, and an auxiliary server apparatus 208, as illustrated in FIG. 4. Each of the first secure computation server apparatus 200_1, the second secure computation server apparatus 200_2, the third secure computation server apparatus 200_3, and the auxiliary server apparatus 208 is connected to communicate with each other through a network.

Figure 5:
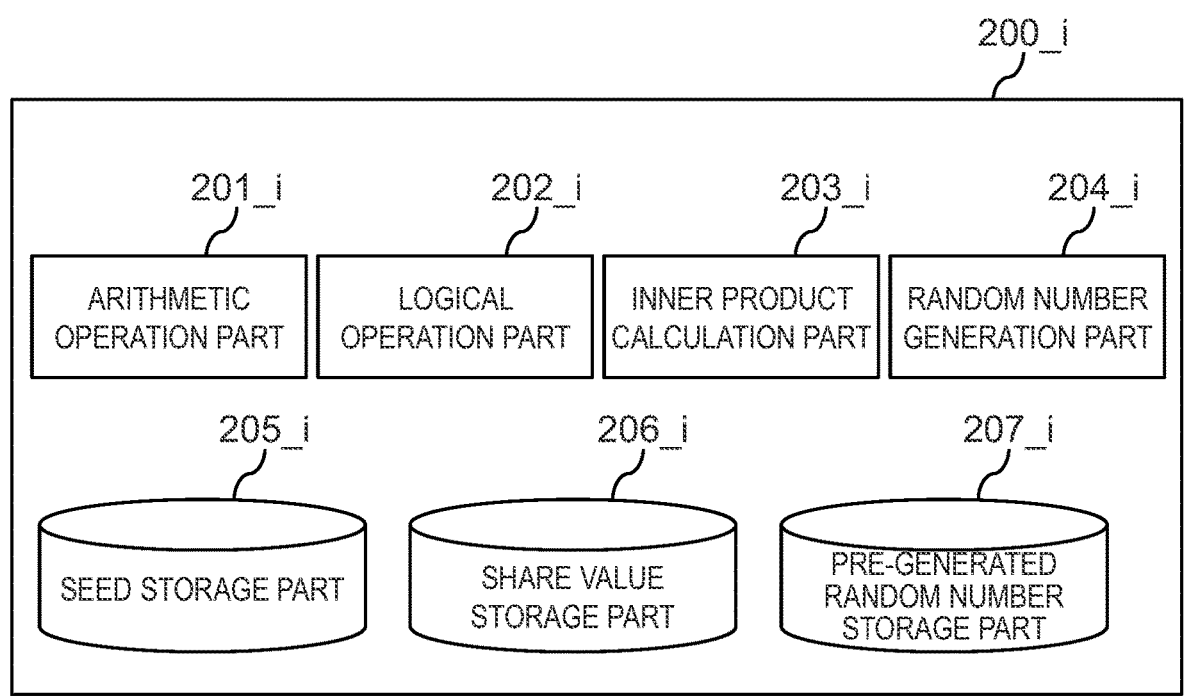
FIG. 5 is a block diagram for illustrating an example of a functional configuration of a secure computation server apparatus.
Figure 6:
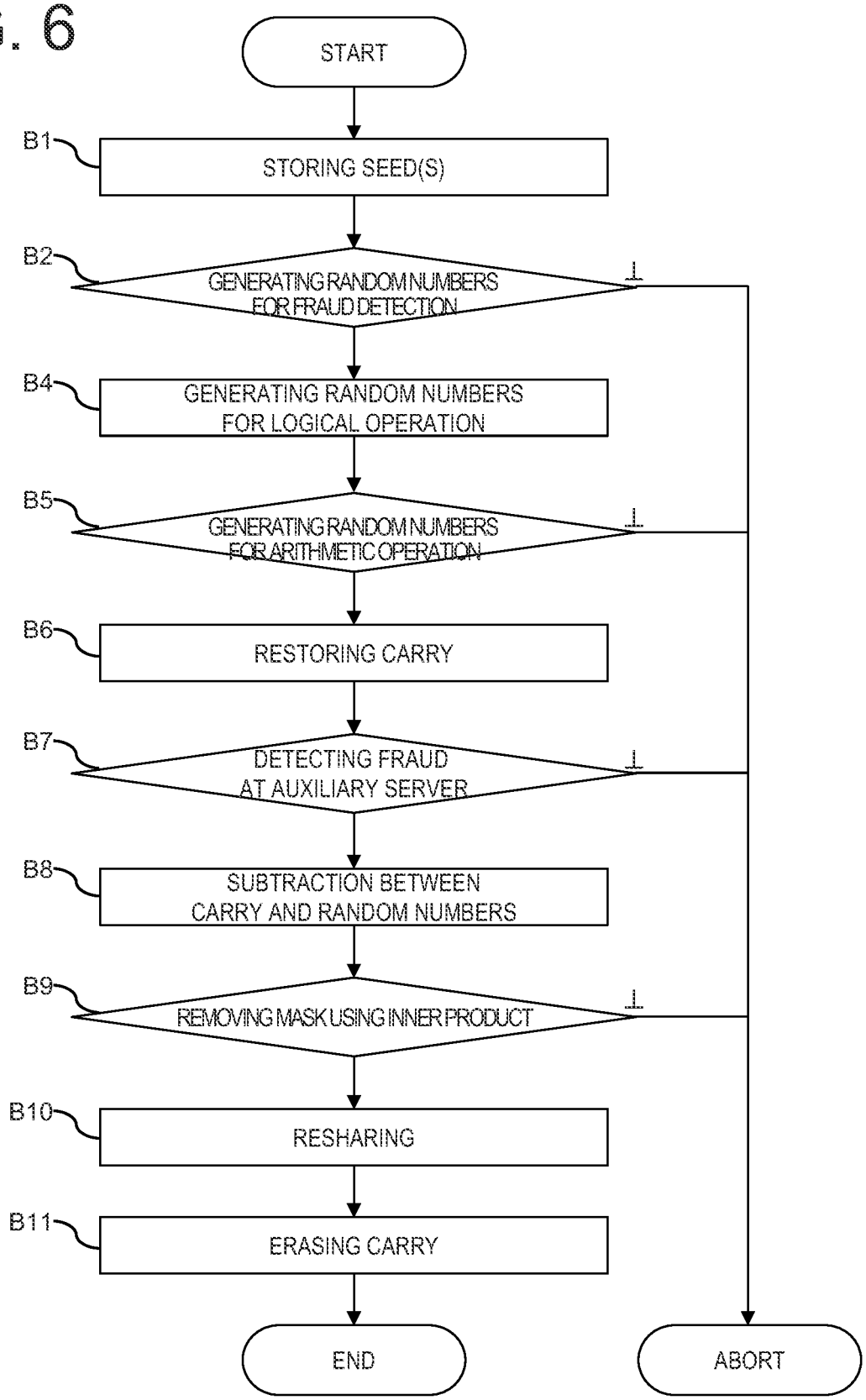
FIG. 6 is a flow chart for illustrating an example of operation regarding a bit-recomposition.

FIG. 5 is a block diagram for illustrating an example of a functional configuration of the secure computation server apparatus. A secure computation server apparatus 200_i (i=1, 2, 3) shown in FIG. 5 is an example of a functional configuration that is representative of the first secure computation server apparatus 200_1, the second secure computation server apparatus 200_2, and the third secure computation server apparatus 200_3.

As illustrated in FIG. 5, the secure computation server apparatus 200_i is provided with an arithmetic operation part 201_i, a logical operation part 202_i, an inner product calculation part 203_i, a random number generation part 204_i, a seed storage part 205_i, a share value storage part 206_i, and a pre-generated random number storage part 207_i. The arithmetic operation part 201_i, the logical operation part 202_i the inner product calculation part 203_i, the random number generation part 204_i, the seed storage part 205_i, the share value storage part 206_i, and the pre-generated random number storage part 207_i can also be realized by a processor executing a program stored in a memory with a hardware configuration illustrated below.

In the secure computation system 200, provided with the first to the third secure computation server apparatuses 200_i (i=1, 2, 3) of above configuration, for a value(s) of $x_0, \ldots, x_{k-1}$ ($x = \Sigma_{j=0}^{k-1} 2^j x_j$, $x_j \in Z_2$) inputted from one of the first to the third secure computation server apparatuses 200_i among the first to the third secure computation server apparatuses 200_i (i=1, 2, 3), a share [x] is computed, without being known of the value(s) of $x_0, \ldots, x_{k-1}$ ($x = \Sigma_{j=0}^{k-1} 2^j x_j$, $x_j \in Z_2$) from the inputted value and/or a value(s) generated in computation processes, and the share [x] is stored in each of the share value storage parts 206_i of the first to the third secure computation server apparatuses 200_i (i=1, 2, 3), respectively.

In addition, in the secure computation system 200, provided with the first to the third secure computation server apparatuses 200_i (i=1, 2, 3) of above configuration, for the share of $[[x_0]], \ldots, [[x_{k-1}]]$ ($x = \Sigma_{j=0}^{k-1} 2^j x_j$, $x_j \in Z_2$) stored in each of the share value storage parts 206_i of the first to the third secure computation server apparatuses 200_i (i=1, 2, 3), a share [x] is computed, without being known of the value(s) of $x_0, \ldots, x_{k-1}$ ($x = \Sigma_{j=0}^{k-1} 2^j x_j$, $x_j \in Z_2$) from a value(s) generated in the computation processes, and the share [x] is stored in each of the share value storage parts 206_i of the first to the third secure computation server apparatuses 200_i (i=1, 2, 3), respectively.

Furthermore, in the secure computation system 200, provided with the first to the third secure computation server apparatuses 200_i (i=1, 2, 3) of above configuration, for a share of $[[x_0]], \ldots, [[x_{k-1}]]$ ($x = \Sigma_{j=0}^{k-1} 2^j x_j$, $x_j \in Z_2$) inputted from an apparatus other than the first to the third secure computation server apparatuses 200_i (i=1, 2, 3), a share [x] is computed, without being known of the value(s) of $x_0, \ldots, x_{k-1}$ ($x = \Sigma_{j=0}^{k-1} 2^j x_j$, $x_j \in Z_2$) from a value(s) generated in computation processes, and the share [x] is stored in each of the share value storage parts 206_i of the first to the third secure computation server apparatuses 200_i (i=1, 2, 3), respectively.

It is noted that the share of the above computation result may be restored by transmitting and receiving the share among the first to the third secure computation server apparatuses 200_1 to 200_3. Alternatively, the share may be restored by transmitting the share to an outside other than the first to the third secure computation server apparatuses 200_1 to 200_3.

Next, a secure computation method according to the second example embodiment of the present invention will be described in detail. That is, an operation of the secure computation system 200 provided with the first to the third secure computation server apparatuses 200_i (i=1, 2, 3) and the auxiliary server apparatus 208, as described above, will be described. FIG. 6 is a flow chart for illustrating an example of operation related to the bit-recomposition. Each step is described below.

(Step B1)

The secure computation system 200 performs the same processing as step A1 described above. That is, the secure computation system 200 stores seeds $(k_i, k_{i+1})$ in each of the seed storage parts 205_i of the first to the third secure computation server apparatuses 200_i (i=1, 2, 3), respectively. It is noted that the first to the third secure computation server apparatuses 200_i (i=1, 2, 3) share a pseudo random number generator H in each of the random number generation parts 104_i.

(Step B2)

Next, the secure computation system 200 generates random numbers for fraud detection. Concretely, each of the random number generation parts 204_$i$ of the first to the third secure computation server apparatuses 200_$i$ ($i=1, 2, 3$) performs generation of random numbers for fraud detection related to the arithmetic operation and the matrix operation, as follows:

$([a_j],[b_j],[c_j]) \leftarrow$ A-TripleGen (for $j=0, \ldots, k-1$)
$([a'_j],[b'_j],[c'_j]) \leftarrow$ A-TripleGen (for $j=0, \ldots, k-1$)
$([A_j],[B_j],[C_j]) \leftarrow$ M-TripleGen (for $j=0, \ldots, k-1$)

It is noted that if fraud is detected during the process of generating the random numbers for fraud detection (step B2; $\perp$), $\perp$ is output and the process is aborted. Then, each of the random number generation parts 204_$i$ stores ($[a_j]$, $[b_j]$, $[c_j]$), ($[a'_j]$, $[b'_j]$, $[c'_j]$) and ($[A_j]$, $[B_j]$, $[C_j]$) in the pre-generated random number storage parts 207_$i$. Note that abort means to stop processing based on the judgment that an abnormality has been detected.

(Step B4)

The secure computation system 200 performs generation of random numbers for the logical operation using the same processing as Step A4 described above. That is, the first to the third secure computation server apparatuses 200_$i$ ($i=1, 2, 3$) generate random numbers $[[r_j]]_i$ for the logical operation and store $[[r_j]]_i$ in the pre-generated random number storage parts 207_$i$.

(Step B5)

Next, the secure computation system 200 performs generation of random numbers for the arithmetic operation. Concretely, the arithmetic operation parts 201_$i$ of the first to the third of the secure computation server apparatuses 200_$i$ ($i=1, 2, 3$) perform following processing using $[[r_j]]_i$, $([a_j], [b_j], [c_j])$ and $([a'_j], [b'_j], [c'_j])$. $[r_j] \leftarrow$ m-BitInjection $([[r_j]], ([a_j], [b_j], [c_j]), ([a'_j], [b'_j], [c'_j]))$ (for $j=0, \ldots, k-1$)

It is noted that if fraud is detected during the above processing (step B5; $\perp$), $\perp$ is output and the process is aborted. Then, each of the arithmetic operation parts 201_$i$ stores $[r_j]_i$ in each of the pre-generated random number storage parts 207_$i$.

(Step B6)

The secure computation system 200 performs restoration of the carry using the same processing as step A6 described above. It is noted that in the secure computation method according to the second example embodiment of the present invention, the secure computation system 200 uses shares $[[x_0]]_i, \ldots, [[x_{k-1}]]_i (x=\Sigma_{j=0}^{k-1} 2^j x_j, x_j \in Z_2)$, which are to be targets of the bit-recomposition and are stored in each of the share value storage parts 206_$i$, for the first time for processing in step B6.

(Step B7)

Next, the secure computation system 200 verifies whether there is a fraud in the carry $C_{j,1}$ ($i=1, 2, 3$) transmitted in step B6.

First of all, verification of a carry $C_{j,3}$ received at the logical operation part 202_1 will be described. First, the logical operation part 202_1 transmits a value obtained by masking the received carry $C_{j,3}$ with random numbers and other value(s) to the auxiliary server apparatus 208. The auxiliary server apparatus 208 determines, whether the value of $C_{j,3}$, which is received at the logical operation part 202_1 and the logical operation part 202_2, has been tampered by using the value transmitted from the logical operation part 202_1 and the logical operation part 202_2, respectively. If a verification equation (*) described below is valid, the auxiliary server apparatus 208 continues the processings thereafter. If it is not valid (step B7; $\perp$), the auxiliary server apparatus 208 outputs $\perp$ and aborts the processings.

Subsequently, the logical operation part 202_1 computes followings. After computation, the logical operation part 202_1 transmits m'$_j$, $m_{j,1,1}$, $m_{j,1,2}$ to the auxiliary server apparatus 208.

$$m'_j = c_{j,3} \text{ XOR } H(k_2, vid'_1) \text{ XOR } H(k_2, vid'_2)$$

$$m_{j,1,1} = H(k_2, vid_{j,1}) \text{ XOR } x_{j,1}$$

$$m_{j,1,2} = H(k_2, vid'_1) \text{XOR} (H(k_2, vid'_{j,1}) \cdot H(k_2, vid_{j,2})) \text{XOR} (H(k_2, vid_{j,2}) \cdot x_{j,1}) \text{XOR } H(k_1, vid_{j,\alpha}) \quad \text{[Math 5]}$$

On the other hand, the logical operation part 202_2 computes followings. After computation, the logical operation part 202_2 transmits $m_{j,2,1}$, $m_{j,2,2}$ to the auxiliary server apparatus 208.

$$m_{j,2,1} = H(k_2, vid_{j,2}) \text{ XOR } x_{j,3}$$

$$m_{j,2,2} = H(k_2, vid'_2) \text{XOR} (H(k_2, vid_{j,1}) \cdot x_{j,3}) \text{XOR } H(k_3, vid_{j,\alpha}) \text{XOR } H(k_3, vid_j) \quad \text{[Math 6]}$$

The auxiliary server apparatus 208 determines whether or not the following equation holds. If the equation holds, the auxiliary server apparatus 208 continues processings, and if it does not hold (step B7; $\perp$), the auxiliary server apparatus 208 outputs $\perp$ and abort processings.

[Math 7]

$$m'_j = m_{j,1,1} \cdot m_{j,2,1} \text{XOR} m_{j,1,2} \text{XOR} m_{j,2,2} \qquad (*)$$

It is noted that the verification of $C_{j,1}$ and $C_{j,2}$, and the carry $C_{j,3}$ received at the logical operation part 202_2 is performed in the same manner.

(Step B8)

The secure computation system 200 performs subtraction between the carry and the random numbers using the same processing as step A8 described above.

(Step B9)

Next, the secure computation system 200 performs computation to remove the mask from the carry using inner product. Concretely, the inner product calculation parts 203_$i$ of the first to the third secure computation server apparatuses 200_$i$ ($i=1, 2, 3$) perform following computation using $[(C_j \text{ XOR } r_j) - r_j]$ ($j=0, \ldots, k-1$). Here, $[y] = [\Sigma_{j=0}^{k-1} 2^j(-2c_j)]$. It is noted that, here, the inner product calculation parts 203_$i$ perform the fraud detectable (or maliciously secure) inner product calculation, and if fraud is detected (step B9; $\perp$), it outputs $\perp$ and abort processings.

$$\left[\sum_{j=0}^{k-1} 2^j \cdot (-2) \cdot c_j\right] \leftarrow \qquad \text{[Math 8]}$$

$$m - InnerProduct(\left(2^0 \cdot (-2) \cdot [(c_0 XOR\, r_0) - r_0], \ldots,\right.$$

$$2^{k-1} \cdot (-2) \cdot [(c_{k-1} XOR\, r_{k-1}) - r_{k-1}]),$$

$$([(c_0 XOR\, r_0) - r_0, \ldots, [(c_{k-1} XOR\, r_{k-1}) - r_{k-1}]), ([A], [B], [C]))$$

After computation, each of the inner product calculation parts 203_$i$ transmits $[y]_i$ to each share value storage part 206_$i$, respectively, and each share value storage part 206_$i$ stores $[y]_i$, therein.

(Step B10)

The secure computation system 200 performs resharing using the same processing as step A10 described above.

15

(Step B11)

The secure computation system 200 erases carry using the same processing as step A11 described above. Thus, the first to the third secure computation server apparatuses 200_$i$ ($i$=1, 2, 3) can obtain [x]$_i$ after bit-recomposition from shares [[x$_0$]]$_i$, . . . , [[x$_{k-1}$]]$_i$(x=$\Sigma_{j=0}^{k-1}$ 2$^j$x$_j$, x$_j \in Z_2$), which are to be targets of the bit-recomposition.

The second example embodiment of the present invention described above has advantageous effects which will be described in the following.

According to the second example embodiment of the present invention, efficiency is improved in a processing, such as the bit-recomposition, where the bit-injections (or paddings) is performed in parallel. As explained above, according to the second example embodiment of the present invention, processings of steps B1 to B5 can be performed independently of the input, therefore, only processings of steps B6 to B11 are computed accompanying the input, and the order of communication traffic in processings of steps B6 to B11 is suppressed to O(k). As mentioned above, when bit-injection (or padding) is performed k times in parallel, the order of communication traffic is O(k$^2$), therefore, according to the second example embodiment of the present invention, as compared in the communication traffic after input, communication traffic is improved with respect to orders of magnitude. In other words, the second example embodiment of the invention is fraud detectable (or maliciously secure) and remarkably efficient.

It should be noted that the second example embodiment of the present invention is not limited to the fraud detectable (or maliciously secure) bit-recomposition but can also be applied to processing, such as fraud detectable (or maliciously secure) PopCount (counting the number of bit(s) that has a value of 1). In that case, the processing in Step B9 and the processing in Step B11 above should be modified as in the first example embodiment.

Third Example Embodiment

Hereinafter, referring to FIG. 7, FIG. 8, and FIG. 9, description will proceed to a secure computation system and a secure computation method according to a third example embodiment of the present invention.

Figure 7:
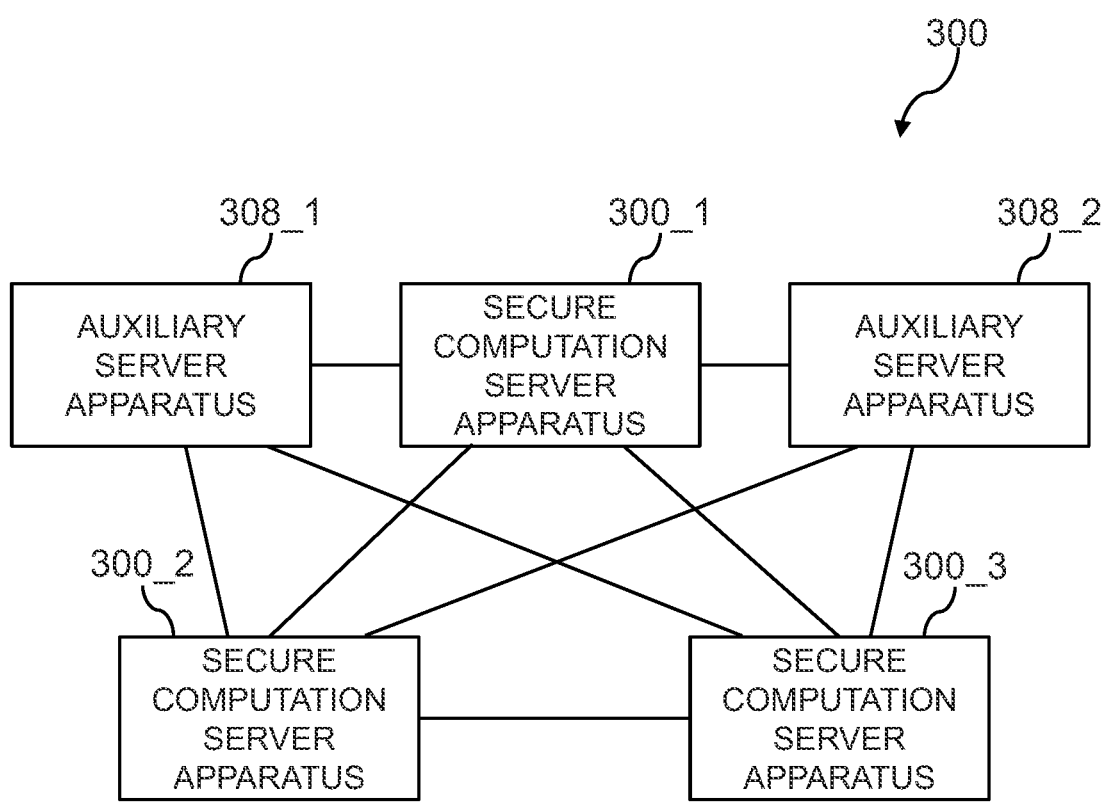
FIG. 7 is a block diagram for illustrating an example of a functional configuration of a secure computation system according to a third example embodiment of the present invention.

FIG. 7 is a block diagram for illustrating an example of a functional configuration of the s secure computation system according to the third example embodiment of the present invention. A secure computation system 300 according to the third example embodiment of the present invention is provided with a first secure computation server apparatus 300_1, a second secure computation server apparatus 300_2, a third secure computation server apparatus 300_3, a first auxiliary server apparatus 308_1, and a second auxiliary server apparatus 308_2, as illustrated in FIG. 7. Each of the first secure computation server apparatus 300_1, the second secure computation server apparatus 300_2, the third secure computation server apparatus 300_3, a first auxiliary server apparatus 308_1, and a second auxiliary server apparatus 308_2 is connected to communicate with each other through a network.

Figure 8:
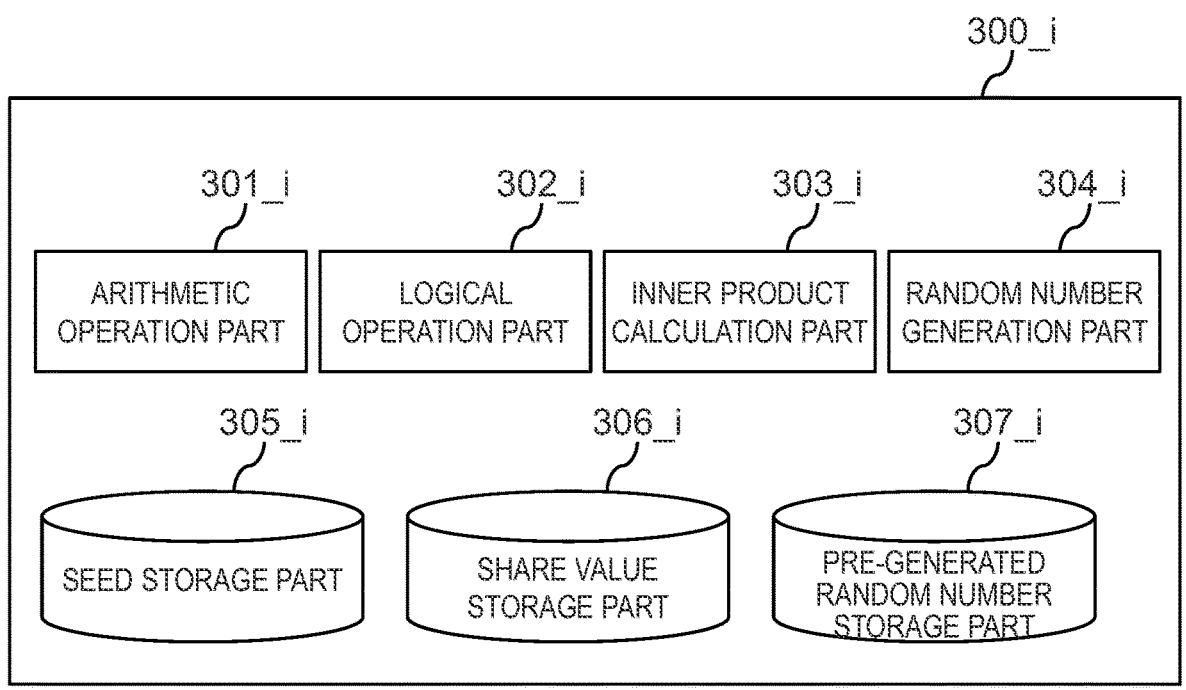
FIG. 8 is a block diagram for illustrating an example of a functional configuration of a secure computation server apparatus.
Figure 9:
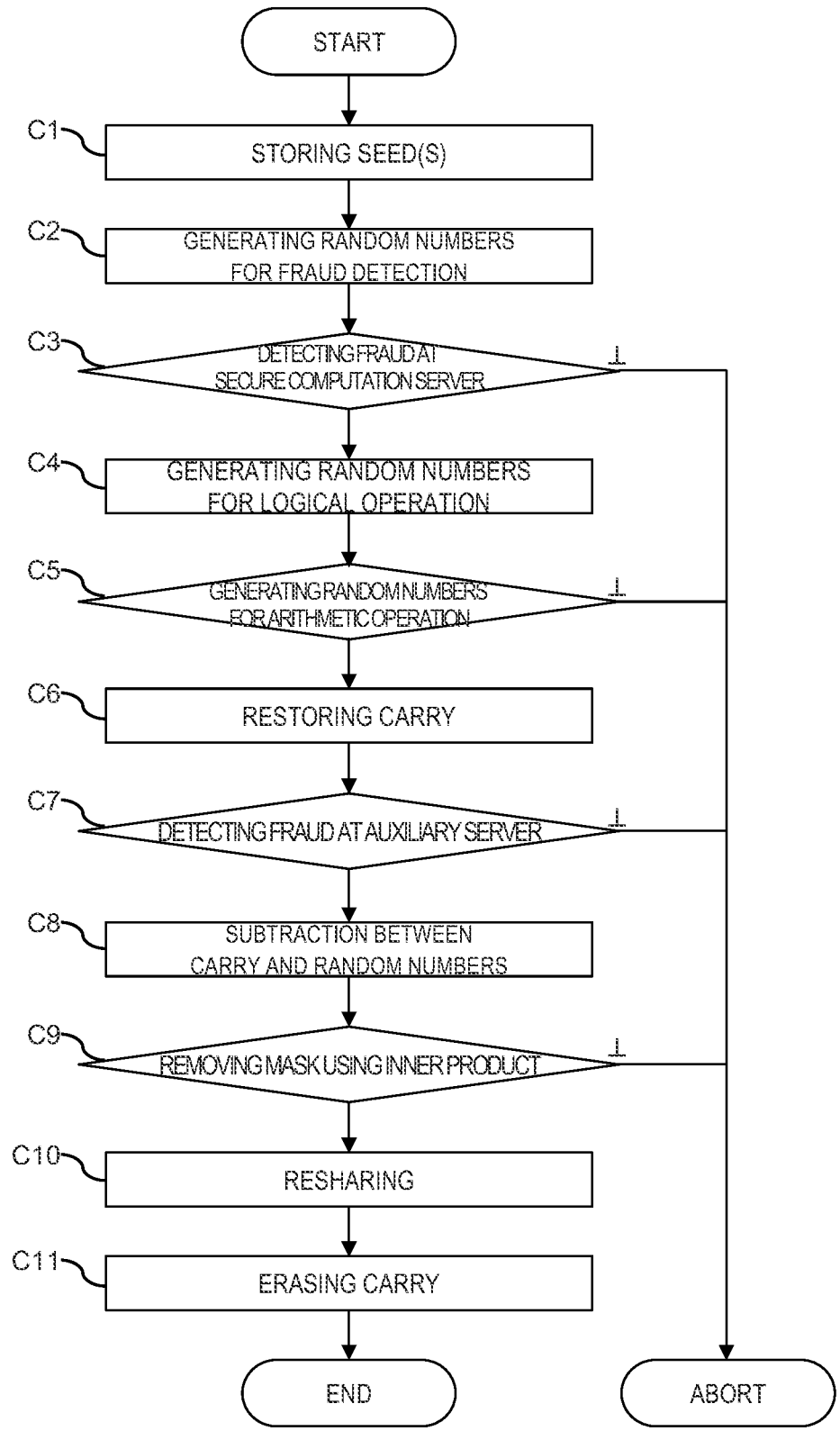
FIG. 9 is a flow chart for illustrating an example of operation regarding a bit-recomposition.

FIG. 8 is a block diagram for illustrating an example of a functional configuration of the secure computation server apparatus. A secure computation server apparatus 300_$i$ ($i$=1, 2, 3) shown in FIG. 8 is an example of a functional configuration that is representative of the first secure computation server apparatus 300_1, the second secure computation server apparatus 300_2, and the third secure computation server apparatus 300_3.

16

As illustrated in FIG. 8, the secure computation server apparatus 300_$i$ is provided with an arithmetic operation part 301_$i$, a logical operation part 302_$i$, an inner product calculation part 303_$i$, a random number generation part 304_$i$, a seed storage part 305_$i$, a share value storage part 306_$i$, and a pre-generated random number storage part 307_$i$. The arithmetic operation part 301_$i$, the logical operation part 302_$i$, the inner product calculation part 303_$i$, the random number generation part 304_$i$, the seed storage part 305_$i$, the share value storage part 306_$i$, and the pre-generated random number storage part 307_$i$ can also be realized by a processor executing a program stored in a memory with a hardware configuration illustrated below.

In the secure computation system 300, provided with the first to the third secure computation server apparatuses 300_$i$ ($i$=1, 2, 3) of above configuration, for a value(s) of x$_0$, . . . , x$_{k-1}$ (x=$\Sigma_{j=0}^{k-1}$ 2$^j$x$_j$, x$_j \in Z_2$) inputted from one of the first to the third secure computation server apparatuses 300_$i$ among the first to the third secure computation server apparatuses 300_$i$ ($i$=1, 2, 3), a share [x] is computed, without being known of the value(s) of x$_0$, . . . , x$_{k-1}$ (x=$\Sigma_{j=0}^{k-1}$ 2$^j$x$_j$, x$_j \in Z_2$) from the inputted value and/or a value(s) generated in computation processes, and the share [x] is stored in each of the share value storage parts 306_$i$ of the first to the third secure computation server apparatuses 300_$i$ ($i$=1, 2, 3), respectively.

In addition, in the secure computation system 300, provided with the first to the third secure computation server apparatuses 300_$i$ ($i$=1, 2, 3) of above configuration, for the share of [[x$_0$]], . . . , [[x$_{k-1}$]](x=$\Sigma_{j=0}^{k-1}$ 2$^j$x$_j$, x$_j \in Z_2$) stored in each of the share value storage parts 306_$i$ of the first to the third secure computation server apparatuses 300_$i$ ($i$=1, 2, 3), a share [x] is computed, without being known of the value(s) of x$_0$, . . . , x$_{k-1}$ (x=$\Sigma_{j=0}^{k-1}$ 2$^j$x$_j$, x$_j \in Z_2$) from a value(s) generated in the computation processes, and the share [x] is stored in each of the share value storage parts 306_$i$ of the first to the third secure computation server apparatuses 300_$i$ ($i$=1, 2, 3), respectively.

Furthermore, in the secure computation system 300, provided with the first to the third secure computation server apparatuses 300_$i$ ($i$=1, 2, 3) of above configuration, for a share of [[x$_0$]], . . . , [[x$_{k-1}$]](x=$\Sigma_{j=0}^{k-1}$ 2$^j$x$_j$, x$_j \in Z_2$) inputted from an apparatus other than the first to the third secure computation server apparatuses 300_$i$ ($i$=1, 2, 3), a share [x] is computed, without being known of the value(s) of x$_0$, . . . , x$_{k-1}$ (x=$\Sigma_{j=0}^{k-1}$ 2$^j$x$_j$, x$_j \in Z_2$) from a value(s) generated in computation processes, and the share [x] is stored in each of the share value storage parts 306_$i$ of the first to the third secure computation server apparatuses 300_$i$ ($i$=1, 2, 3), respectively.

It is noted that the share of the above computation result may be restored by transmitting and receiving the share among the first to the third secure computation server apparatuses 300_1 to 300_3. Alternatively, the share may be restored by transmitting the share to an outside other than the first to the third secure computation server apparatuses 300_1 to 300_3.

Next, a secure computation method according to the third example embodiment of the present invention will be described in detail. That is, an operation of the secure computation system 300 provided with the first to the third secure computation server apparatuses 300_$i$ ($i$=1, 2, 3), the first auxiliary server apparatus 308_1, and the auxiliary server apparatus 308_2, as described above, will be described. FIG. 9 is a flow chart for illustrating an example of operation related to the bit-recomposition. Each step is described below.

(Step C1)

The secure computation server apparatuses 300_1 to 300_3 in the secure computation system 300 perform operations equal to those performed in Step A1. Then, the first auxiliary server apparatus 308_1 and the second auxiliary server apparatus 308_2 share a seed' and a pseudo random number generator H.

(Step C2)

Next, the first auxiliary server apparatus 308_1 and the second auxiliary server apparatus 3082 generate random numbers $a, b \in Z_2^k$ using the shared seed' and the shared pseudo random number generator H. In addition, the first auxiliary server apparatus 308_1 and the second auxiliary server apparatus 308_2 generate ([a], [b], [ab]) using the shared seed' and the shared pseudo random number generator H to share (or distribute) them to the first to the third secure computation server apparatuses 300_1 to 300_3.

(Step C3)

The first to the third secure computation server apparatuses 300_1 to 300_3 determine whether or not the values received from each of the first auxiliary server apparatus 308_1 and the second auxiliary server apparatus 308_2, match, in step C2. If the values match, the first to the third secure computation server apparatuses 300_1 to 300_3 continue with subsequent processings, and if the values mismatch (Step C3; ⊥), output ⊥ and abort the processings.

Subsequently, the secure computation system 300 performs the same processing as steps B4 to B11 in steps C4 to C11. That is, the secure computation system 300 performs generating random numbers of the logical operation in step C4, generating random numbers of the arithmetic operation in step C5, restoring carry in step C6, verifying whether there is a fraud in the carry in step C7, subtracting between the carry and random numbers in step C8, removing the mask from the carry using inner product in step S9, resharing in step S10, and erasing the carry in step C11. Thus, the first to the third secure computation server apparatuses 300_i (i=1, 2, 3) obtain [x]$_i$ after bit-recomposition from shares $[[x_0]]_i, \ldots, [[x_{k-1}]]_i (x=\Sigma_{j=0}^{k-1} 2^j x_j, x_j \in Z_2)$, which are to be targets of bit-recomposition.

It is noted that in the secure computation method according to the third example embodiment of the present invention, the secure computation system 300 uses shares $[[x_0]]_i, \ldots, [[x_{k-1}]]_i (x=\Sigma_{j=0}^{k-1} 2^j x_j, x_j \in Z_2)$, which are to be targets of the bit-recomposition and are stored in each of the share value storage part 306_i, for the first time for processing in step C6.

The third example embodiment of the present invention described above has advantageous effects which will be described in the following.

According to the third example embodiment of the present invention, efficiency is improved in a processing, such as the bit-recomposition, where the bit-injections (or paddings) is performed in parallel. As explained above, according to the second example embodiment of the present invention, processings of steps B1 to B5 can be performed independently of the input, therefore, only processings of steps B6 to B11 are computed accompanying the input, and the order of communication traffic in processings of steps B6 to B11 is suppressed to O(k). As mentioned above, when bit-injection (or padding) is performed k times in parallel, the order of communication traffic is $O(k^2)$, therefore, as compared in the communication traffic after input, according to the second example embodiment of the present invention, communication traffic is improved with respect to orders of magnitude. In other words, the second example embodiment of the invention is fraud detectable (or maliciously secure) and remarkably efficient However, unlike the second example embodiment, the third example embodiment of the present invention allows for definitive fraud detection. In the first effect in the second example embodiment, only probabilistic fraud detection could be performed. Therefore, communication traffic would increase when trying to improve the probability of fraud detection. In contrast, the fraud detection is performed decisively in the third example embodiment.

It should be noted that the third example embodiment of the present invention is not limited to the fraud detectable (or maliciously secure) bit-recomposition but can also be applied to processing, such as fraud detectable (or maliciously secure) PopCount (counting the number of bit(s) that has a value of 1). In that case, the processing in Step C9 and the processing in Step C11 above should be modified as in the first example embodiment. PopCount, which applies the third example embodiment of the present invention, also enables a definitive fraud detection, as does bit-recomposition.

[Hardware Configuration]

Figure 10:
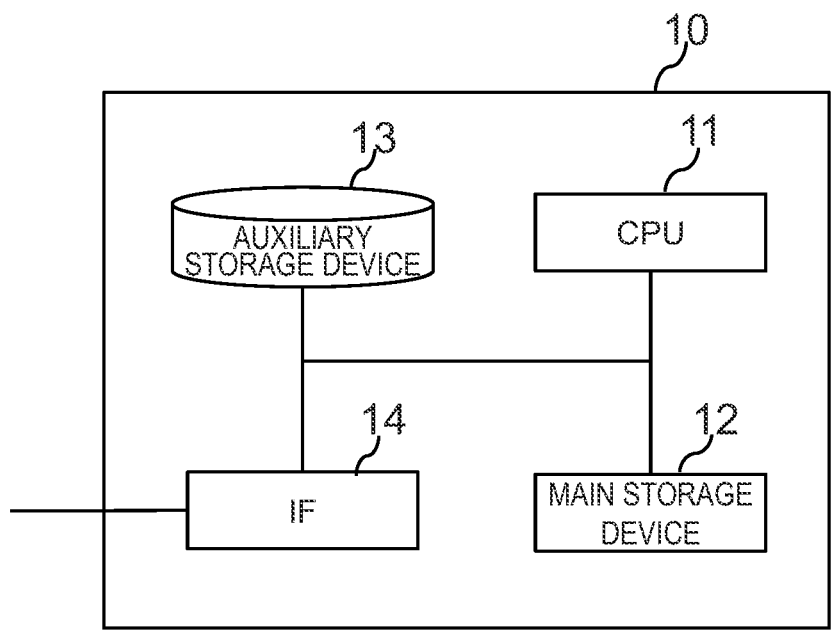
FIG. 10 is a diagram illustrating an example of a hardware configuration of the secure computation server apparatus.

FIG. 10 is a diagram illustrating an example of a hardware configuration of the secure computation server apparatus. That is, the hardware configuration illustrated in FIG. 10 is hardware configurations of the secure computation server apparatuses 100_i, 200_i, 300_i (i=1, 2, 3). An information processing apparatus (computer) employing the hardware configuration illustrated in FIG. 10 can realize each function of the secure computation server apparatuses 100_i, 200_i, 300_i by executing the secure computation method described above as a program.

It should be noted that the hardware configuration illustrated in FIG. 10 is one example of a hardware configuration realizing each function of the secure computation server apparatuses 100_i, 200_i, 300_i (i=1, 2, 3), and is not intended to limit the hardware configuration of the secure computation server apparatuses 100_i, 200_i, 300_i (i=1, 2, 3). The secure computation server apparatuses 100_i, 200_i, 300_i (i=1, 2, 3) may include hardware not illustrated in FIG. 10.

The hardware configuration 10 that can be employed by the secure computation server apparatuses 100_i, 200_i, 300_i (i=1, 2, 3) is provided with a CPU (Central Processing Unit) 11, a main storage device 12, an auxiliary storage device 13 and an IF (Interface) part 14, which are interconnected by an internal bus, as illustrated in FIG. 10.

CPU 11 executes each instruction included in a secret calculation program executed by the secure computation server apparatuses 100_i, 200_i, 300_i (i=1, 2, 3). The main storage device 12 has, for example, a RAM (Random Access Memory), and temporarily stores various programs such as the secret calculation program executed by the secure computation server apparatus 100_i, 200_i, 300_i (i=1, 2, 3) for processing by the CPU 11.

The auxiliary storage device 13 has, for example, a HDD (Hard Disk Drive), and can store various programs such as the secret calculation program executed by the secure computation server apparatus 100_i, 200_i, 300_i (i=1, 2, 3) in mid and long term. The various programs such as the secret calculation program may provide as a program product recorded in a non-transitory computer readable storage medium. The auxiliary storage device 13 can be used to store various programs such as the secret calculation program recorded in the non-transitory computer readable storage medium in mid and long term.

The IF part 14 provides an interface for an input/output between the secure computation server apparatuses 100_i, 200_i, 300_i (i=1, 2, 3). The IF part 14 also can be used as an interface for an input/output between apparatuses including the auxiliary server apparatuses 208, 308_1, 308_2.

An information processing apparatus employing the hardware configuration illustrated above can realize each function of the secure computation server apparatuses 100_i, 200_i, 300_i by executing the secure computation method described above as a program.

A part or a whole of the above-mentioned example embodiments may be described as, but not limited to, the following supplementary notes.

[Supplementary Note 1]
A secure computation system, including at least three or more secure computation server apparatuses connected to each other through a network, wherein each of the secure computation server apparatuses includes:
 a random number generation part that shares a pseudo random number generator, the pseudo random generator being shared among the secure computitting server apparatuses;
 a seed storage part that shares and stores a seed(s) used for generating random numbers in the random number generation part;
 a pre-generated random number storage part that stores random numbers generated by the random number generation part;
 a share value storage part that stores at least a share(s) to be a target of processing;
 a logical operation part that computes at least a carry to be transmitted and received among the secure computation server apparatuses using the random numbers and the share(s) to be a target of processing;
 an inner product calculation part that removes a mask from the carry; and
 an arithmetic operation part that performs at least a processing of erasing the carry to obtain a processing result.

[Supplementary Note 2]
The secure computation system described in the supplementary note 1, wherein
 the random numbers include random numbers for a logical operation and random numbers for an arithmetic operation.

[Supplementary Note 3]
The secure computation system described in supplementary note 2, wherein
 the random numbers for the arithmetic operation are obtained by performing a processing of a bit-injection (or padding) on the random numbers for the logical operation.

[Supplementary Note 4]
The secure computation system described in any one of supplementary notes 1 to 3, wherein
 the processing result is obtained from the share(s) to be a target of processing by a type conversion accompanying modulus conversion.

[Supplementary Note 5]
The secure computation system described in supplementary note 4, wherein
 the processing result is obtained from the share(s) to be a target of processing by a processing of a bit-recomposition, the bit-recomposition recompositting bits included in the share(s) to be a target of processing.

[Supplementary Note 6]
The secure computation system described in supplementary note 4, wherein
 the processing result is obtained from the share(s) to be a target of processing by a processing to count a number of bits with a value of 1 in the share(s) to be a target.

[Supplementary Note 7]
The secure computation system described in any one of supplementary notes 1 to 6 including:
 an auxiliary server apparatus interconnected to the secure computation server apparatuses through the network, wherein
 the auxiliary server apparatus performs a fraud detection using the carry.

[Supplementary Note 8]
The secure computation system described in any one of supplementary notes 1 to 7 including:
 two auxiliary server apparatuses interconnected to the secure computation server apparatuses through the network, wherein
 the two auxiliary server apparatuses share a seed(s) and a pseudo random number generator for generating random numbers for a fraud detection.

[Supplementary Note 9]
A secure computation server apparatus that is one of at least three or more secure computation server apparatuses connected to each other through a network, including: a random number generation part that shares a pseudo random number generator, the pseudo random generator being shared among the secure computation server apparatuses;
 a seed storage part that shares and stores a seed(s) used for generating random numbers in the random number generation part;
 a pre-generated random number storage part that stores random numbers generated by the random number generation part;
 a share value storage part that stores at least a share(s) to be a target of processing;
 a logical operation part that computes at least a carry to be transmitted and received among the secure computation server apparatuses using the random numbers and the share(s) to be a target of processing;
 an inner product calculation part that removes a mask from the carry; and
 an arithmetic operation part that performs at least a processing of erasing the carry to obtain a processing result.

[Supplementary Note 10]
A secure computation method using at least three or more secure computation server apparatuses connected to each other through a network, including:
 generating random numbers using a pseudo random number generator shared among the secure computation server apparatuses;
 computing a carry to be transmitted and received among the secure computation server apparatuses using the random numbers and a share to be a target of processing;
 removing a mask from the carry by an inner product calculation; and
 erasing the carry to obtain a processing result.

[Supplementary Note 11]
The secure computation method described in supplementary note 10, wherein
 the random numbers include random numbers for a logical operation and random numbers for an arithmetic operation.

[Supplementary Note 12]

The secure computation method described in supplementary note 11, wherein
the random numbers for the arithmetic operation are obtained by performing a processing of a bit-injection (or padding) to the random numbers for the logical operation.

[Supplementary Note 13]

The secure computation method described in any one of supplementary notes 10 to 12, wherein
the random numbers include random numbers for a fraud detection.

[Supplementary Note 14]

The secure computation method described in any one of supplementary notes 10 to 13, wherein
the inner product calculation is performed after fraud detection using the carry at a server apparatus other than the secure computation server apparatuses.

[Supplementary Note 15]

The secure computation method described in any one of supplementary notes 10 to 14, wherein
the inner product calculation is a fraud detectable (or maliciously secure) inner product calculation.

[Supplementary Note 16]

The secure computation method described in any one of supplementary notes 10 to 15, including:
performing a fraud detection using random numbers received from two server apparatuses other than the secure computation server apparatuses.

[Supplementary Note 17]

A non-transitory computer-readable medium storing therein a secure computation program that causes at least three or more secure computation server apparatuses connected to each other through a network to execute processes, including:
generating random numbers using a pseudo random number generator shared among the secure computation server apparatuses;
computing a carry to be transmitted and received among the secure computation server apparatuses using the random numbers and a share to be a target of processing;
removing a mask from the carry by an inner product calculation; and
erasing the carry to obtain a processing result.

It should be noted that, each disclosure of the PTLs and NPLs cited above is incorporated herein by reference thereto. It is to be noted that it is possible to modify or adjust the example embodiments or examples within the whole disclosure of the present invention (including the Claims) and based on the basic technical concept thereof. Further, it is possible to variously combine or select (or partially delete) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed even without specific recital thereof. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

| REFERENCE SIGNS LIST | |
|---|---|
| 100, 200, 300 | secure computation system |
| 100_i, 200_i, 300_i | secure computation server apparatus |
| 101_i, 201_i, 301_i | arithmetic operation part |
| 102_i, 202_i, 302_i | logical operation part |
| 103_i, 203_i, 303_i | inner product calculation part |
| 104_i, 204_i, 304_i | random number generation part |
| 105_i, 205_i, 305_i | seed storage part |
| 106_i, 206_i, 306_i | share value storage part |
| 107_i, 207_i, 307_i | pre-generated random number storage part |
| 208, 308_1, 308_1 | auxiliary server apparatus |

What is claimed is:

1. A secure computation system comprising at least three or more secure computation server apparatuses connected to each other through a network, wherein each of the secure computation server apparatuses comprises:
   a processor; and
   a memory in circuit communication with the processor,
   wherein the processor is configured to execute program instructions stored in the memory to implement:
   a random number generation part that generates random numbers using a pseudo random number generator, the pseudo random generator being shared among the secure computation server apparatuses;
   a seed storage part that shares and stores at least one seed used for generating the random numbers in the random number generation part;
   a pre-generated random number storage part that stores the random numbers generated by the random number generation part;
   a share value storage part that stores at least one share to be a target of processing;
   a logical operation part that computes at least a carry to be transmitted and received among the secure computation server apparatuses using the random numbers and the at least one share to be the target of processing;
   an inner product calculation part that removes a mask from the carry; and
   an arithmetic operation part that performs at least a processing of erasing the carry to obtain a processing result.

2. The secure computation system according to claim 1, wherein
   the random numbers include random numbers for a logical operation and random numbers for an arithmetic operation.

3. The secure computation system according to claim 2, wherein
   the random numbers for the arithmetic operation are obtained by performing a processing of a bit-injection on the random numbers for the logical operation.

4. The secure computation system according to claim 1, wherein
   the processing result is obtained from the at least one share to be the target of processing by a type conversion accompanying modulus conversion.

5. The secure computation system according to claim 4, wherein
   the processing result is obtained from the at least one share to be the target of processing by a processing of a bit-recomposition, the bit-recomposition recomposing bits included in the at least one share to be the target of processing.

6. The secure computation system according to claim 4, wherein
the processing result is obtained from the at least one share to be the target of processing by a processing to count a number of bits with a value of 1 in the at least one share to be the target.

7. The secure computation system according to claim 1 comprising:
an auxiliary server apparatus interconnected to the secure computation server apparatuses through the network, wherein
the auxiliary server apparatus performs a fraud detection using the carry.

8. The secure computation system according to claim 1 comprising:
two auxiliary server apparatuses interconnected to the secure computation server apparatuses through the network, wherein
the two auxiliary server apparatuses share the at least one seed and the pseudo random number generator for generating the random numbers for a fraud detection.

9. A secure computation server apparatus that is one of at least three or more secure computation server apparatuses connected to each other through a network, comprising:
a processor, and
a memory in circuit communication with the processor, wherein the processor is configured to execute program instructions stored in the memory to implement:
a random number generation part that generates random numbers using a pseudo random number generator, the pseudo random generator being shared among the secure computation server apparatuses;
a seed storage part that shares and stores at least one seed used for generating random numbers in the random number generation part;
a pre-generated random number storage part that stores the random numbers generated by the random number generation part;
a share value storage part that stores at least a at least one share to be a target of processing;
a logical operation part that computes at least a carry to be transmitted and received among the secure computation server apparatuses using the random numbers and the at least one share to be the target of processing;
an inner product calculation part that removes a mask from the carry; and
an arithmetic operation part that performs at least a processing of erasing the carry to obtain a processing result.

10. A secure computation method using at least three or more secure computation server apparatuses connected to each other through a network, comprising:
generating random numbers using a pseudo random number generator shared among the secure computation server apparatuses;
computing a carry to be transmitted and received among the secure computation server apparatuses in logical operation using the random numbers and at least one share to be a target of processing;
removing a mask from the carry by an inner product calculation; and
erasing the carry to obtain a processing result in arithmetic operation.

11. The secure computation method according to claim 10, wherein
the random numbers include random numbers for a logical operation and random numbers for an arithmetic operation.

12. The secure computation method according to claim 11, wherein
the random numbers for the arithmetic operation are obtained by performing a processing of a bit-injection to the random numbers for the logical operation.

13. The secure computation method according to claim 10, wherein
the random numbers include random numbers for a fraud detection.

14. The secure computation method according to claim 10, wherein
the inner product calculation is performed after fraud detection using the carry at a server apparatus other than the secure computation server apparatuses.

15. The secure computation method according to claim 10, wherein
the inner product calculation is a fraud detectable inner product calculation.

16. The secure computation method according to claim 10, comprising:
performing a fraud detection using the random numbers received from two server apparatuses other than the secure computation server apparatuses.

17. A non-transitory computer-readable medium storing therein a secure computation program that causes at least three or more secure computation server apparatuses connected to each other through a network to execute processes, comprising:
generating random numbers using a pseudo random number generator shared among the secure computation server apparatuses;
computing a carry to be transmitted and received among the secure computation server apparatuses in logical operation using the random numbers and at least one share to be a target of processing;
removing a mask from the carry by an inner product calculation; and
erasing the carry to obtain a processing result in arithmetic operation.

* * * * *